Sept. 26, 1967  E. M. JONES  3,344,418
DEVICE AND METHOD FOR PRODUCING CODE MEMBERS
Filed May 22, 1964  8 Sheets-Sheet 3

Inventor:
Edward M. Jones
By: Stone, Wiseman,
Burmeister & Gummer
Attorneys

Sept. 26, 1967  E. M. JONES  3,344,418
DEVICE AND METHOD FOR PRODUCING CODE MEMBERS
Filed May 22, 1964  8 Sheets-Sheet 8

INVENTOR.
EDWARD M. JONES
BY
Stone, Njerman, Burmeister & Zimmer
ATTY.

United States Patent Office 3,344,418
Patented Sept. 26, 1967

3,344,418
DEVICE AND METHOD FOR PRODUCING
CODE MEMBERS
Edward M. Jones, Cincinnati, Ohio, assignor to D. H.
Baldwin Company, Cincinnati, Ohio, a corporation of
Ohio
Filed May 22, 1964, Ser. No. 369,423
14 Claims. (Cl. 340—347)

This application is a continuation-in-part of patent application Ser. No. 203,354, of the present inventor, filed June 18, 1962, entitled "Device and Method for Producing Code Members," now Patent No. 3,235,878.

The present invention relates to devices for producing code members for use in electrical generators. More specifically, the present invention relates to devices and methods for producing code discs for analog to digital encoders.

Code discs are well-known for encoding analog information into binary digits. Such code discs have a plurality of annular tracks of opaque and transparent sectors co-axially disposed about the center of the code disc. An analog to digital encoder employing such a disc has a light source disposed adjacent to one side of the code disc, and a light responsive cell confronting each of the tracks of the code disc on the other side of the code disc. The code disc is mounted on a shaft, and the angular position of the shaft may be read in digital form by periodically sampling the response of the light responsive cells. Patent No. 3,023,406, entitled "Optical Encoder," issued Feb. 27, 1962, of the present inventor, illustrates such an optical encoder.

Code discs have been produced in the past in accordance with the teachings of Patent No. 2,924,138 of the present inventor, dated Feb. 9, 1960, and entitled "Electronic Synchronizing System for Producing Pitch Discs and the Like." In accordance with the teachings of this patent, a photosensitive layer is rotated on the surface of a turntable rotated at a rate synchronized with a pulse generator, and the pulse generator is utilized to periodically flash a lamp focused on a small area of the turntable. In this manner, a plurality of tracks may be exposed on the photosensitive surface containing exposed areas which are a multiple of the number of the pulses of the pulse generator for each rotation of the turntable. Code discs for analog to digital converters may be directly produced by this equipment.

The method of producing code discs disclosed in Patent No. 2,924,138 has the disadvantage that the number of light pulses per revolution of the turntable is limited to a multiple of the pulses from the synchronizing pulse generator. As a result, it has proven difficult to produce code discs for analog to digital encoders which directly read in terms of trigonometric functions, since the spacing between the transparent sectors of such discs varies in accordance with the trigonometric function used in encoding the angular position of the disc.

Patent No. 3,235,878, of the present inventor discloses a device for making code discs capable of encoding a non-linear function from a tape. As here described, the indicia of the tape are separately detected and recorded on a disc rotating on a turntable synchronized in rate with the tape transport mechanism. This method of making code discs, however, requires the information on the tape to be exactly the information to be recorded on the code disc. It is an object of the present invention to provide a device and a method for making cold discs responsive to the value of the digital output of a tape, rather than responsive to the position of the indicia on the tape.

For example, modern computers are readily capable of calculating the values of a trigonometric function for a plurality of angles. If each of these angles is separated by a fixed increment, the indicia on the tape may be used directly to record the values of that trigonometric function for each of the angles calculated. This, however, inherently produces an error, since the values of the function at fixed intervals are recorded rather than the transitions of the function. It is, therefore, an object of the present invention to provide a method and a device for producing non-linear code discs which records values of the function encoded at the transition points rather than at fixed intervals.

The inventor's Patent No. 3,235,878, filed June 18, 1962, discloses a means for synchronizing a magnetic tape with a turntable which utilizes a plurality of pulses generated responsive to the position of the turntable and a second plurality of pulses generated responsive to the position of the tape. Also as disclosed in this application, the magnetic tape carries a digital code which is converted by a digital to analog converter to an analog electrical signal for controlling a recorder which impresses indicia on a photosensitive film carried by the turntable. It is a further object of the present invention to provide an apparatus and method for encoding discs with indicia at locations responsive to the digital value of indicia on a tape.

These and further objects of the present invention will become readily apparent to those skilled in the art from the following specification, particularly when viewed in the light of the drawings, in which.

Figures 1, 2, 3:
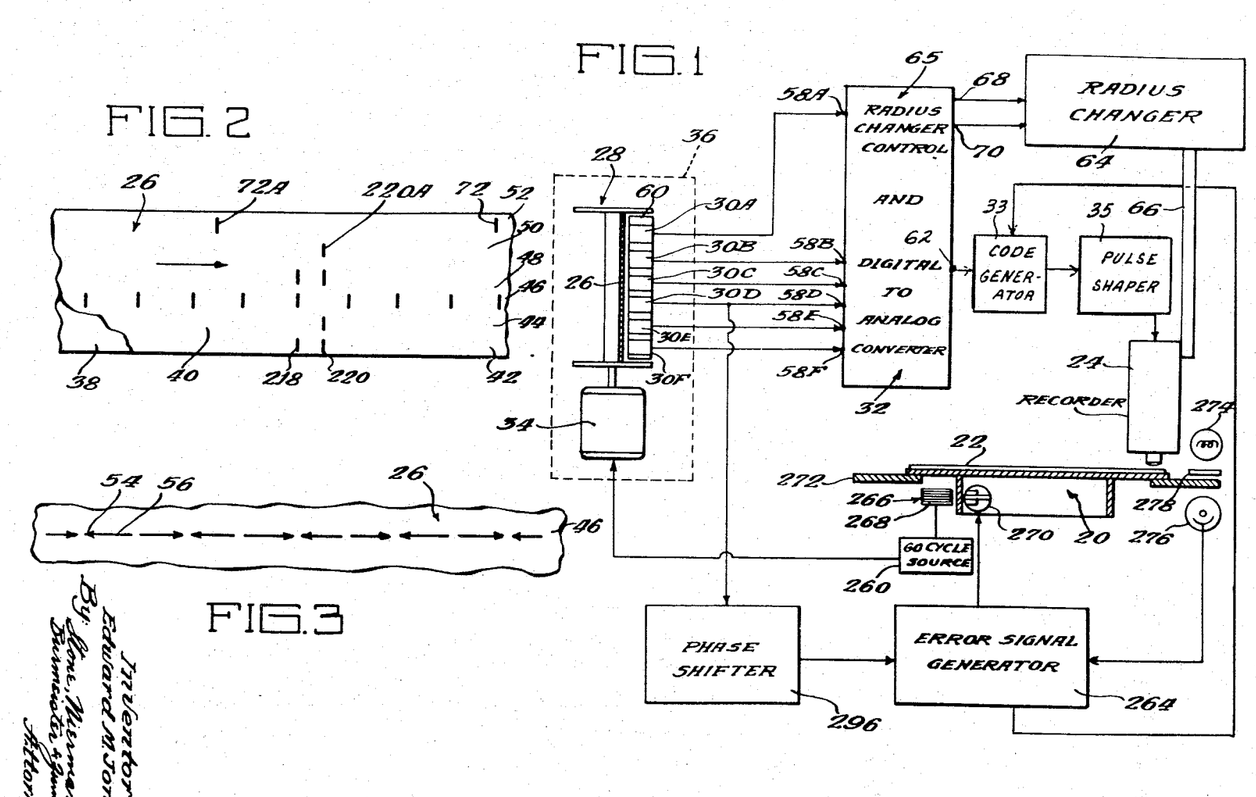
FIGURE 1 is a schematic electrical diagram illustrating a device for recording indicia on a member generated from digital electrical signals derived from a tape.
FIGURE 2 is a fragmentary schematic view of a magnetic tape for use in the machine of FIGURE 1 illustrating the location of recorded indicia thereon.
FIGURE 3 is a schematic diagram illustrating the polarization vectors in a portion of the tape of FIGURE 2.

FIGURE 1 illustrates a turntable 20 which carries centrally thereof a disc 22 upon which indicia are to be recorded to form a code disc. A recorder 24 confronts a portion of the disc 22 and is adapted to alter a characteristic of the disc in order to inscribe or place thereon the necessary indicia. The disc 22 may be a photographic sensitive film, and the recorder 24 is the combination of a light source focused on the photosensitive film and a shutter for interrupting the light falling upon the disc 22, preferably a ribbon modulator such as disclosed for the purpose in Patent No. 2,950,470 of the present inventor. The disc 22 may also be a magnetically polarizable plate, and the recorder 24 a recording head capable of aligning polarization vectors along desired axes, as is conventional in magnetic recording.

The recorder 24 is controlled by a plurality of electrical signals generated from a tape 26 mounted on a tape transport mechanism 28. In the embodiment of FIGURE 1, the tape 26 is a magnetic tape, and a plurality of magnetic reproducing heads 30A, 30B, 30C, 30D, 30E and 30F confront the tape 26 along an axis normal to the longitudinal axis of the tape 26 and in close adjacency. Each of the recording heads is separately connected to a digital to analog converter 32 which converts the electrical signals separately generated by the reproducing heads to a single electrical signal appearing at the output of the digital to analog converter 32, and this output is electrically connected to the input of a code generator 33. The output of the code generator 33 must be properly shaped and amplified for the ribbon modulator type of recorder and is therefore connected to the ribbon modulator recorder 24 through a pulse shaper 35, as described in Patent No. 2,950,470.

The tape transport mechanism 28 is driven by a synchronous electrical motor 34, and the tape 26, tape transport mechanism 28, reproducing heads 30A, 30B, 30C, 30D, 30E and 30F, and the motor 34, comprise a means for generating electrical signals representing digital values for controlling the light source to encode the disc 22, this generating means being enclosed within the dashed lines designated 36 in FIGURE 1.

A fragment of the magnetic tape 26 is illustrated in FIGURE 2, and this tape is of the type which is conventionally used with computer equipment. The ultimate code pattern must first be determined, and may be any sequence of opaque and transparent sectors. Generally, the code pattern will represent a mathematical function, generally indicated as $f(x)$. A plurality of values for the function $f(x)$ may be calculated for exposing a plurality of sectors of a co-axial track on the turntable, and the number of values which may be used is determined by the mechanical accuracy of the equipment including the accuracy with which the tape transport mechanism 28 is synchronized with the turntable 20. From these values, control values are calculated and impressed on the magnetic tape 26 for controlling the light source to produce the desired pattern, as will be more fully described hereinafter.

FIGURES 2 and 3 illustrate a fragmentary portion of the tape 26 in detail. The tape 26 has an elongated strip base 38 of nonmagnetic electrically insulating material, such as a polyester such as Mylar, and a coating 40 of ferromagnetic material is disposed on the base 38. The coating 40 is capable of maintaining magnetic polarization, and a plurality of tracks designated 42, 44, 46, 48, 50, and 52 are disposed upon the tape 26 along parallel paths parallel to the axis of elongation of the tape. Each of the tracks represents the area confronting a single reproducing head 30 for reproducing a signal from that track of the tape when the entire tape passes the playback head assembly 60.

Each track of the tape 26 contains a series of alternating indicia of two types, the indicia being the transitions of magnetic polarizations in opposite directions in the case of the magnetic tape 26. FIGURE 3 shows the polarizations for the track 46. The arrows 54 are polarized parallel to the track 46 in one direction, and the arrows 56 disposed between the arrows 54 are polarized in the opposite direction. In this manner, the reproducing head 30D produces an electrical signal of one polarity for a transition after the arrows 54 and a signal of the opposite polarity for a transition after the arrows 56. It is apparent that all of the other tracks of the tape 26 are also polarized in the same manner, except the long arrows are different between the transitions.

The magnetic tape 26 may be magnetically polarized as indicated, or in any other manner which is subject to calculation, directly from the output of an electronic computer. Most such computers directly produce its output in the form of a magnetic tape which can be used as the tape 26. Thus, the calculated output of an electronic computer is directly useable with the equipment of FIGURE 1.

Figure 4:
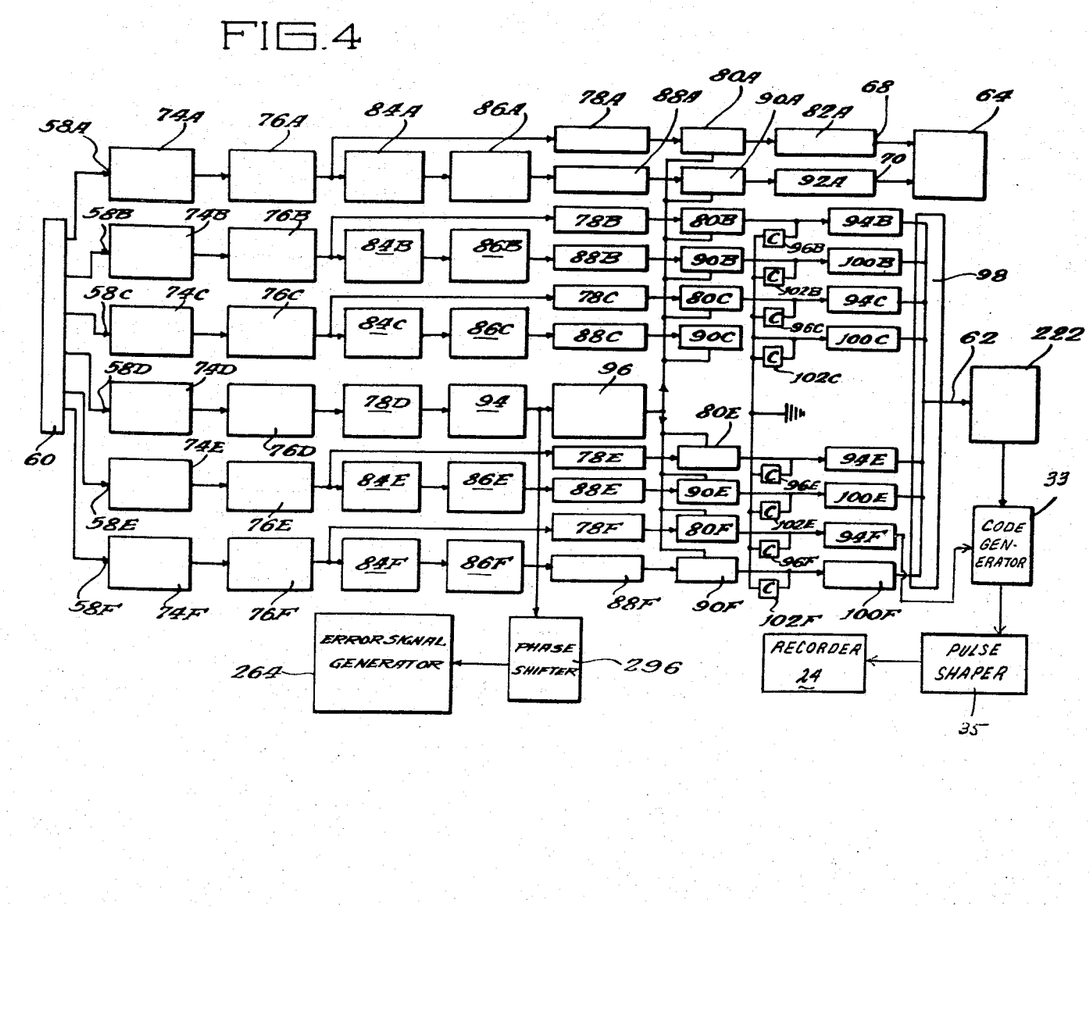
FIGURE 4 is a block schematic diagram of the digital to analog computer illustrated in FIGURE 1.

The digital to analog computer 32 is illustrated as having input terminals 58B, 58C, 58D, 58E and 58F. These terminals are connected to the reproducing heads 30B, 30C, 30D, 30E and 30F, respectively, which are mounted in a common housing to form a playback head assembly 60. The digital to analog converter 32 has an output terminal 62 on which an analog signal voltage is produced which is proportional to the digital value of the signals appearing on the input terminals. FIGURE 4 illustrates in block diagram the circuit for the digital to analog converter 32.

It will be noted in FIGURE 1 that a radius changer 64 is indicated electrically connected to the output of a radius changer control 65 which is included in an assembly with the digital to analog converter 32 and mechanically connected by an arm 66 to the recorder. It is the function of the radius changer 64 to move the recorder toward or away from the axis of the disc 22 in accordance with programming information appearing in the output of the radius changer control 65, and two output terminals 68 and 70 are provided for that purpose. Track 52 of the tape 26 carries instructions for the radius changer 64, and the pickup head 30A detects the presence of an instruction signal, indicated at 72 in FIGURE 2, on the tape 26 and transmits it to the input of a preamplifier 74A, illustrated in FIGURE 4. The output of the preamplifier 74A is connected to the input of an undelayed signal amplifier 76A, and the output of the undelayed amplifier 76A is directly connected to a fullwave rectifier 78A. The output of the fullwave rectifier 78A is electrically connected through a gate circuit 80A and an "in pulse" amplifier 82A to the output terminal 68. The output of the undelayed signal amplifier 76A is also connected through a delay line 84A, a delayed signal amplifier 86A, a fullwave rectifier 88A, a gate 90A and an "out pulse" amplifier 92A to the output terminal 70. As stated above the output terminals 68 and 70 are electrically connected to the radius changer 64 and control its position.

The gates 80A and 90A are controlled by signals from the pickup head 30D. The pickup head 30D is connected to a preamplifier 74D through the input terminal 58D, and the output of the preamplifier 74D is connected to the input of the undelayed amplifier 76D. The output of the undelayed amplifier 76D is connected to the input of a fullwave rectifier 78D, and the output of the rectifier is connected to a resonator 94. The output of the resonator 94 is connected to a toggle and sampling pulse generator 96, and the output of the sampling pulse generator 96 is connected to the control input of both gates 80A and 90A.

The pickup head 30D is aligned with the track 46 of the tape 26, and each of the marks of this track, which correspond to the mark 72 of track 52, generate an electrical pulse in the pickup head 30D of opposite polarity to that generated between the marks, as indicated in connection with the description of FIGURE 3. The pulses of both polarities are amplified by the preamplifier 74D and the undelayed signal amplifier 76D and impressed upon the input of the fullwave rectifier 78D. The rectifier 78D inverts the positive pulse generated by the pickup head 30D, and passes the negative pulses on to the resonator 94 substantially unchanged. The resonator 94 has the resonant frequency of 375 cycles per second, and the pulses of the track 46 of the tape 26 are spaced to generate 375 cycles per second at the rate of transportation of the tape transport mechanism 28. As a result, small errors in the position of a single mark or the omission of a single mark of the track 46 will not appreciably affect the rate of the signal impressed upon the input of the toggle and sampling pulse generator 96.

If the mark 72 of the track 52 is aligned on an axis normal to the axis of the tape 26 with a mark of the track 46, which is the synchronizing track, then a pulse will be delivered from the rectifier 78A to the gate 80A simultaneously with a pulse from the toggle and sampling pulse generator 96 impressed on the control input of the gate 80A. The gate 80A is a coincidence circuit, and will deliver a pulse to the "in pulse" amplifier 82A under these conditions, but will not deliver a pulse to the "in pulse" amplifier unless the two inputs of the gate circuit 80A receive pulses at approximately the same time.

FIGURE 2 shows the marks 72 representing magnetic polarization in the proper direction aligned with a mark on the track 46, and the result is that the "in pulse" amplifier 82A will receive a puse when this portion of the tape confronts the playback head assembly 60. It is also to be noted that a pulse 72A is illustrated in FIGURE 2 which is located between pulses of the synchronizing track 46. Under these circumstances, the gate 80A will not pass a pulse to the "in pulse" amplifier 82A. However, the delay line 84A will delay the pulse generated by the mark 72A generated by the playback head asembly 60, and the delayed pulse will be amplified by the delayed pulse amplifier 86A and rectified by the fullwave rectifier 88A. As a result, pulses will appear on the control input terminal of the gate 90A simultaneously with the pulse impressed on the input of the gate 90A from the fullwave rectifier 88A, thus resulting in a pulse in the output of the gate 90A which is impressed upon the "out pulse" amplifier 92A. The output from the "out pulse" amplifier appears on the terminal 70, and this pulse results in the radius changer 64 moving the arm 66 in the direction to move the recorder 24 outwardly from the center of the disc 22. When a pulse appears in the output of the "in pulse" amplifier 82A, the resulting pulse impressed upon the radius changer 64 causes the arm 66 to move the recorder 24 in a direction toward the axis of the disc 22.

The radius changer 64 is diagrammatically illustrated in FIGURE 1 and is an electromechanical device for positioning the arm 66. For example, the arm 66 may be the pivotal arm of a stepping relay which is driven one step in a first direction by each pulse from the "in pulse" amplier 82A and is driven one step in the reverse direction by each pulse from the "out pulse" amplifier 92A. Since stepping relays and stepping motors suitable for performing this low speed function are well known in the art, as indicated by section 5.39 of "Control Engineer's Handbook," John G. Truxal, editor, McGraw-Hill Book Co., Inc., 1958, the radius changer structure will not be described in detail.

It is to be noted that the fullwave rectifiers 78A, 78D and 88A invert positive pulses impressed thereon but transmit the negative pulses impressed thereon without substantial alteration. As a result, negative pulses are in all cases impressed upon the input of the gate circuits 80A and 90A, and these gate circuits will have an output only if coincidence exists between the pulse on the gate circuit input and on the control input of the gate circuit.

The resonator 94 has a Q which is sufficiently high to produce an output even if one of the marks of the synchronizing track 46 of the tape 26 is missing, or fails to generate a signal, but the Q of this circuit is not sufficiently high to cause appreciable phase shift due to spacing variation of the marks on the track 46 of the tape 26 which may be the result of variations of the rate of transport of the tape 26 during its recording operation.

The track 50 of the tape 26 produced electrical signals on the input 58B of the digital to analog converter 32. Input 58B is electrically connected to a preamplifier 74B, and the output of the preamplifier 74B is electrically connected to an undelayed signal amplifier 76B. The output of the undelayed signal amplifier 76B is electrically connected to the input of a fullwave rectifier 78B and the output of the fullwave rectifier 78B is electrically connected to the input terminal of a gate 80B.

The output of the undelayed signal amplifier 76B is also connected to the input of a delay line 84B, and the output of the delay line 84B is electrically connected to a delayed signal amplifier 86B. The output of the delayed signal amplifier 86B is electrically connected to a fullwave rectifier 88B, and the output of the fullwave rectifier 88B is electrically connected to the input terminal of a gate 90B. The gate 80B and the gate 90B have control input terminals which are electrically connected to the output of the toggle and sampling pulse generator 96.

In like manner, the track 48 of the tape 26 generates an electrical signal on the input terminal 58C of the digital to analog converter 32. A preamplifier 74C is electrically connected to the input terminal 58C, and the output of the preamplifier 74C is electrically connected to an undelayed signal amplifier 76C. The output of the undelayed signal amplifier 76C is connected electrically to the input of a fullwave rectifier 78C and the output of the fullwave rectifier 78C is connected to the input terminal of a gate 80C. The output of the undelayed amplifier 76C is also connected to the input of a delay line 84C, and the output of the delay line 84C is connected to the input of a delayed signal amplifier 86C. The output of the delayed signal amplifier 86C is connected to the input of a fullwave rectifier 88C, and the output of the fullwave rectifier 88C is connected to the input terminal of a gate 90C.

In like manner, track 44 of the tape 26 generates electrical pulses on the input terminal 58E of the digital to analog converter 32. The terminal 58E is electrically connected through a preamplifier 74E, and undelayed signal amplifier 76E, a fullwave rectifier 78E, to the input terminal of a gate 80E. Also, the output of the undelayed signal amplifier 76E is electrically connected to a delay line 84E, a delayed signal amplifier 86E, a fullwave rectifier 88E, to the input terminal of a gate 90E. The gates 80E and 90E also have control input terminals which are connected to the output of the toggle and sampling pulse generator 96.

Further, the track 42 of the tape 26 generates electrical signals of the input terminal 58F of the digital to analog converter 32. A preamplifier 74F, undelayed signal amplifier 76F, fullwave rectifier 78F, and gate 80F are connected to the input terminal 58F. A delay line 84F is also connected to the output of the undelayed signal amplifier 76F, and a delayed signal amplifier 86F and fullwave rectifier 88F are connected between the delay line 84F and a gate 90F. The control input of the gate 90F is also connected to the output of the toggle and sampling pulse generator 96.

The electrical signals impressed upon the input terminals 58B, 58C, 58E and 58F contain the digital input which is to be converted to an analog electrical signal. The output of the gate 80B is connected to the input of a D.C. amplifier 94B, and a capacitor 96B is connected from the input of the D.C. amplifier 94B to ground. The output of the amplifier 94B is connected to a resistor network 98.

In like manner, the output of the gate 90B is connected to the input of a D.C. amplifier 100B, and a capacitor 102B is connected from the input of this amplifier to ground.

The output of the gate 80C is connected to the input of a D.C. amplifier 94C, and a capacitor 96C is connected between the input of the amplifier 94C to ground. The output of the gate 90C is connected to the input of an amplifier 100C, and the input of the amplifier 100C is connected by a capacitor 102C to ground.

The output of the gate 80E is connected to the input of a D.C. amplifier 94E, and the input of the amplifier 94E is connected to ground through a capacitor 96E. In like manner, the output of the gate 90E is connected to the input of a D.C. amplifier 100E, and the input of the amplifier 100E is connected to ground through a capacitor 102E.

The output of the gate 80F is connected to the input of a D.C. amplifier 94F, and the input of the amplifier 94F is connected to ground through a capacitor 96F. Also, the output of the gate 90F is connected to the input of a D.C. amplifier 100F and a capacitor 102F is connected between the input of the D.C. amplifier 100F and ground. The output of the D.C. amplifiers 94B, 100B, 94C, 100C, 94E, 100E, and 100F are connected to the resistor network 98, and amplifier 94F to the code generator 33.

Figure 5:
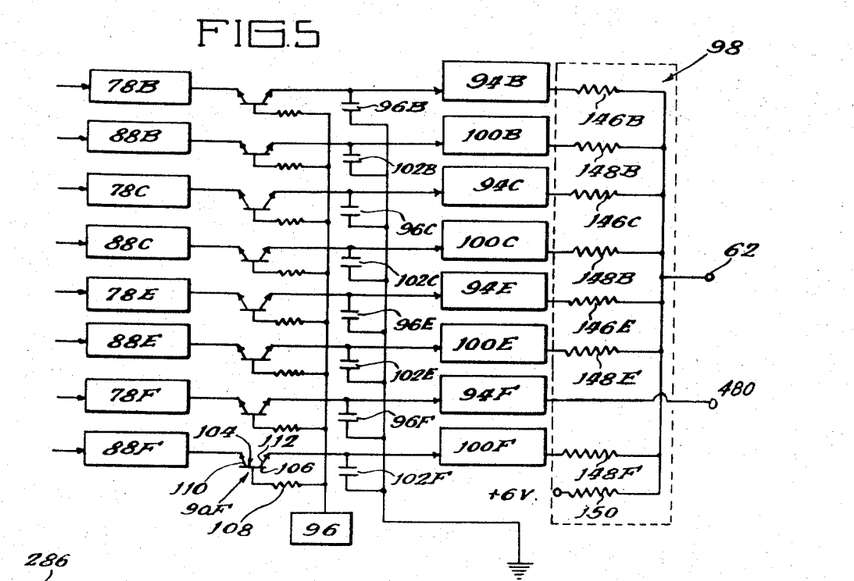
FIGURE 5 is a schematic electrical circuit diagram of the digital to analog converter illustrated in FIGURE 1, FIGURES 5a and 5b illustrating details thereof.

FIGURE 5 illustrates in greater detail the electrical circuit of a portion of the digital to analog converter illustrated in FIGURE 4 by block diagram including the resistor network 98, the fullwave rectifiers 78B, 88B, 78C, 88C, 78E, 88E, 87F and 88F, and the intervening circuits. Also, FIGURES 5a and 5b illustrate the electrical circuit diagram for each of the gates 80B, 90B, 80C, 90C, 80E, 90E, 80F and 90F, and the circuit diagram for one of the fullwave rectifiers 88F.

It will be noted that each of the gate circuits utilizes a transistor 104 with a base 106 electrically connected through a resistor 108 to the toggle and sampling pulse generator 96. The input element 110 of the transistor 104 is electrically connected to the output terminal of the fullwave rectifier 88F, and the output element 112 is electrically connected to input of the D.C. amplifier 100F. The transistor 104 is a symmetrical transistor, which means that it will conduct equally well in both directions. As a result, the negative pulse appearing at the output of the fullwave rectifier 88 will charge the capacitor 102F to the instantaneous negative potential of the pulse during the period in which a pulse is received from the toggle and sampling pulse generator 96, or discharge the capacitor to this value. The other gate circuits designated 80A, 90A, 80B, 90B, 80C, 90C, 80E, 90E, and 80F operate in the same manner.

Figure 5A:
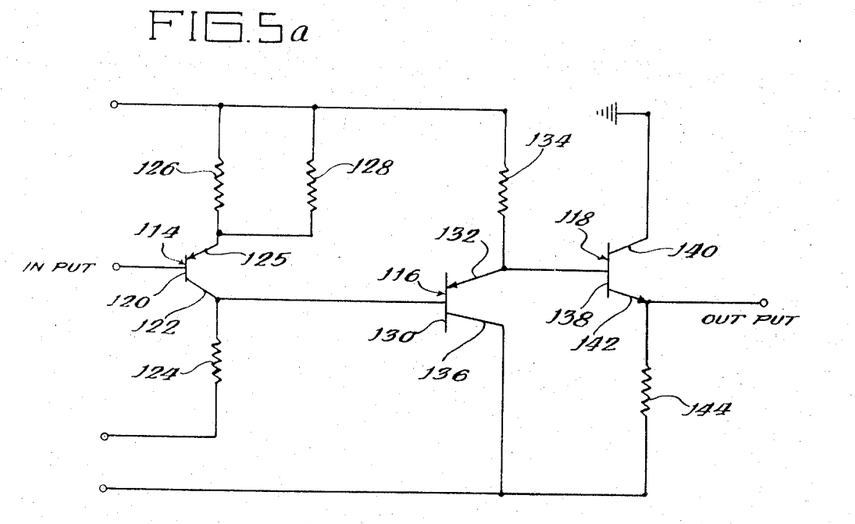
Figure 5B:
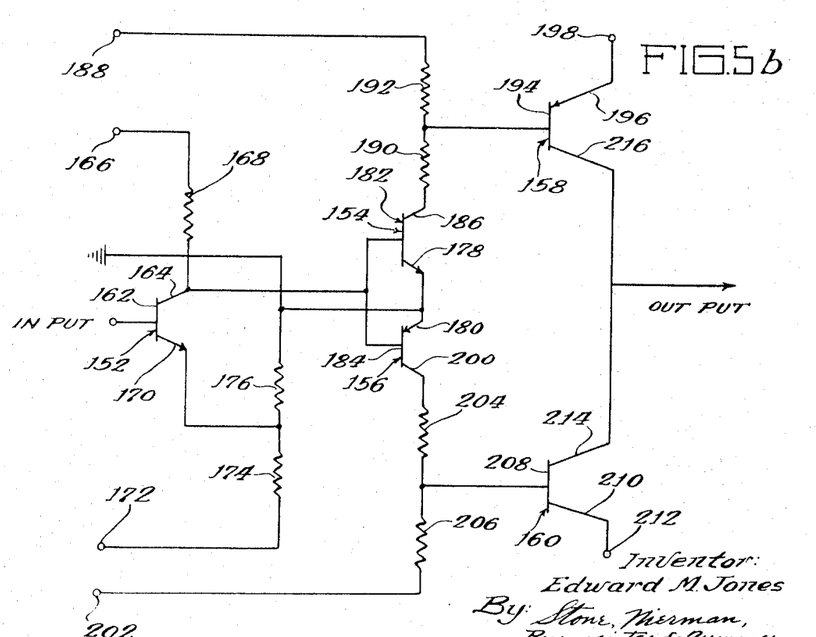

FIGURE 5a also illustrates one of the fullwave rectifiers 88F, although it is to be understood that the other fullwave rectifiers 78A, 88A, 78B, 88B, 78C, 88C, 78E, 88E, and 78F may be of identical construction. The purpose of the full wave rectifiers is to invert positive pulses to negative pulses while transmitting the negative pulses substantially unaltered. In this manner, the positive and negative pulses from the tape 26 may both be utilized.

The full wave rectifier 88F employs three transistors 114, 116, and 118. The base 120 of the transistor 114 forms the input of the rectifier, and the collector 122 of the transistor 114 is connected to the negative terminal of a power source through a resistor 124. The emitter is connected to the positive terminal of a power source through a resistor 126. A balancing resistor 128 is connected in parallel with the resistor 126. The collector 122 of the transistor 114 is electrically connected to the base 130 of the transistor 116. The emitter 132 of the transistor 116 is also connected to the positive terminal of a power source through a resistor 134, and the collector 136 is connected to a negative terminal of the power source.

The emitter 132 of transistor 116 is electrically connected to the base 138 of the transistor 118, and the collector 140 of this transistor is connected to ground. The emitter 142 of the transistor 118 is connected to the same negative terminal of the power source as the collector 136 of transistor 116 through a resistor 144. The output of the full wave rectifier 88F is taken from the emitter 142 of the transistor 118 which is directly connected to the emitter 110 of the gate circuit 90F.

In the particular construction described, the positive terminal of the power source is at a potential of plus 6 volts relative to the collector 140, or ground terminal, and the collector 122 of transistor 114 is electrically connected to a terminal of the power source having a potential of minus 6 volts. The collector 136 of transistor 116 is connected to a terminal of the power source of minus 10 volts. Transistors 114 and 116 are a type 2N368, and transistor 118 is of a type 2N312.

The output of the gate 90F charges the capacitor 102F to the instantaneous value of the output of the gate 90F at the moment of a pulse from the toggle and sampling pulse generator 96. In practice, outputs from the tape 26 representing "1" always charges the condenser 102F to a potential of known value, and in the particular construction described, this potential is minus 1.4 volts. For the "0," the condenser will be discharged and in the particular construction described, this potential is approximately minus 0.4 volt or less. This mode of operation is also true for the other gate circuits in the digital to analog converter 32.

The signal from the storage capacitor 96B is fed through the D.C. amplifier 94B to a precision resistor 146B. In like manner, the charge on the capacitor 102B is conducted through the D.C. amplifier 100B to a precision resistor 148B. Also, the charge in the capacitors 96C, 102C, 96E, 102E, 96F and 102F are conducted through the D.C. amplifiers 94C, 100C, 94E, 100E, 102F, and 100F to precision resistors 146C, 148C, 146E, 148E and 148F. The terminals of the resistors are all interconnected and connected to a resistor 150 which is connected to the plus terminal of a 6 volt source of direct current. Also, the interconnected resistors are connected to the output terminal 62 of the digital to analog converter 32.

The amplifiers 94B, 100B, 94C, 100C, 94E, 100E, 94F, and 100F are direct current amplifiers which have the property of saturating very accurately in both the positive and the negative directions. The output of each of these amplifiers is either a fixed positive value or a fixed negative value with very small deviations.

One of the D.C. amplifiers, 100F, is also illustrated in FIGURE 5b, and the other D.C. amplifiers are of identical construction. This D.C. amplifier 100F utilizes five transistors 152, 154, 156, 158, and 160. The base 162 of transistor 152 forms the input for the amplifier 100F, and the collector 164 of the transistor 152 is connected to a positive terminal 166 of a power source through a resistor 168. The emitter 170 of transistor 152 is connected to a negative terminal 172 of the power source through a resistor 174, and a second resistor 176 connected to the emitter 170 is connected to ground. The emitter 178 of transistor 154 and the emitter 180 of transistor 156 are also connected to ground, and the base 182 of transistor 154 is connected to the collector 164 of transistor 152, as is also the base 184 of transistor 156. The collector 186 of transistor 154 is connected to the positive terminal 188 of the power source through resistors 190 and 192. The junction of the resistors 190 and 192 is connected to the base 194 of transistor 158, and the emitter 196 of transistor 158 is connected to a positive terminal 198 of the power source.

The collector 200 of the transistor 156 is connected to a negative terminal 202 of a power source through two resistors 204 and 206. The junction between the resistors 204 and 206 is connected to the base 208 of transistor 160. The emitter 210 of transistor 160 is connected to a negative terminal 212 of the power source, and the collector 214 of transistor 160 is connected to the collector 216 of transistor 158. The collectors 214 and 216 form the output of the D.C. amplifier 100F.

In the particular construction described, transistor 152, transistor 154, and transistor 160 are type 2N312. Transistor 156 is a type 2N369 and transistor 158 is a type 2N315A. Terminal 188 is at a potential of plus 10 volts, terminal 166 is at a potential of plus 6 volts, terminal 172 is at a potential of minus 6 volts, terminal 202 is at a potential of minus 10 volts. Terminal 198 is at a potential of plus 6 volts and terminal 212 is at a potential of minus 6 volts. With this particular amplifier, an input potential of minus 0.78 volt applied to the base 162 of transistor 152 results in an output potential of minus 6 volts, which is the output potential applied to terminal 212. When the input potential applied to the base 162 falls to minus 1.08 volts, the output potential is plus 6 volts as seen at the collectors 214 and 216. As a result, a "1" can always be expected to produce plus 6 volts at the output of the D.C. amplifier and a "0" will always produce a minus 6 volts at the output of the D.C. amplifier.

Tracks 42, 44, 48 and 50 produce all of the digital information needed from the tape 26 which is used for controlling the recorder 24. These four tracks on the tape 26 contain eight bits of information which is enough to control the recorder 24 and the code generator 33. To achieve this, the four tracks of the tape 26 carry the information of an 8-digit binary number having values between 0 and 255. If a mark or a "1," such as the mark 218 in FIGURE 2, occurs simultaneously with a clock count, that is a mark on the track 46, the mark represents one of the least significant digits, and hence the four least significant digits of each value encoded on the tape 26 occur on axes which are normal to the axis of elongation of the tape 26 and transverse marks of the track 46 which carry the synchronizing marks. In order of increasing value, the least significant digits occur on tracks 42, 44, 48 and 50. Track 42 controls the output of the D.C. amplifier 94F which is connected to the code generator 33, as will be described hereinafter. The output of the amplifier 94E contributes 1/128 of the total voltage on the output terminal 62, the output of the amplifier 94C contributes 2/128, and the output of the amplifier 94B contributes 4/128 of the potential appearing on output terminal 62. In order to achieve this, the resistors of the resistor network 98 are selected to have the same ratios.

The most significant digits of the code impressed upon the tape 26 occur slightly ahead of the clock counts of the track 46, and in FIGURE 2, the most significant digit of track 42 is indicated by the mark 220. An electrical pulse generated by the mark 220 is delayed by the delay line 84F to occur simultaneously with an electrical pulse generated by the mark 218 of track 42. Also, the more significant digits of the tracks 44, 48 and 50 are likewise delayed to occur simultaneously with the less significant digits. The most significant digit of the tape occurs in the track 50 and is indicated by the mark 220A in FIGURE 2. The tracks 48, 44, and 42 contain decreasingly significant digits preceding the clock count. Hence, the resistor 148B is 1/64 of the resistor 146E, and the resistor 146C is 1/32 of that resistor. In like manner, resistors 148E and 148F are 1/16 and 1/8, respectively, of the value of resistor 146E.

In the particular construction described in this application, resistor 146E has a value of 80,000 ohms, and the output of the terminal 62 when all "1's," or marks, confront the playback head assembly 60, a potential of 6 volts is attained. When all "0's" confront the playback head 60 on the tape 26, the potential obtained is minus 3.13 volts. For other combinations of digits between these values, the voltage obtained is a function of the digital value of the marks of "1's" on the tape 26.

As indicated in FIGURE 4, the output from the resistor network 98 which appears on terminal 62 is impressed upon the input of a direct current power amplifier 222. The output of the direct current power amplifier 222 is impressed upon the code generator 33, as illustrated in FIGURE 9.

As previously stated, the motor 34 for the transport mechanism must be synchronized to the turntable 20 in order for the coaxial tracks of patterns to assume the proper radial positions. As illustrated in FIGURE 1, the motor 34 is driven from an alternating current source 262 and is a synchronous motor, but the motor 34 cannot be expected to transport the tape 26 at an absolutely constant rate. For this reason, the pulses generated by the track 46 of the tape 26 are conducted to an error signal generator 264 which generates an error voltage for controlling the motor 266 which drives the turntable 20. The motor 266 is a two-phase alternating current induction motor and has one coil 268 connected to the alternating current source 260 and a second coil 270 or control coil connected to the output of the error signal generator.

A comparison signal for the error signal generator is generated by means of a disc 272 affixed about the periphery of the turntable 20 and carrying a coaxial track with the turntable 20 of alternate opaque and transparent sectors of equal length. A lamp 274 is disposed on one side of the track of alternate opaque and transparent sectors of the disc 272, and a photocell 276 confronts the opposite side of the track. A slit member 278 is disposed between the lamp 274 and the disc 272, so that the photocell generates an electrical signal for each transpart sector of the disc 272. This construction has been substantially described in the present inventor's Patent No. 2,924,138. The photocell 276 is connected to the error signal generator 266, and phase differences between the signals generated from the track 46 of the tape 26 and the position of the disc 272 affixed on the turntable 20 are used to control acceleration and deceleration of the turntable 20 to maintain it in synchronism with the tape 26.

Figure 6:
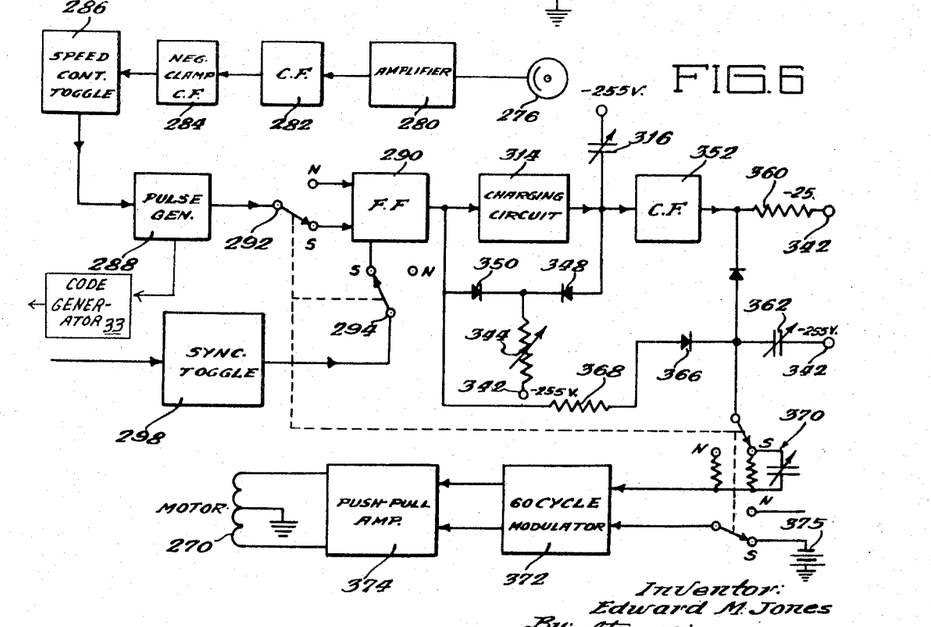
FIGURE 6 is a block schematic diagram of the error signal generator illustrated in the machine of FIGURE 1.

FIGURE 6 illustrates the error signal generator 264 in block diagram. The photocell 276 is illustrated connected to the input of an amplifier 280, and the output of the amplifier 280 is connected to a cathode follower 282. The output of the cathode follower 282 is connected to a negative clamp cathode follower 284, and the output of this cathode follower 284 is connected to a toggle circuit 286.

The purpose of the amplifier 280 and cathode followers 282 and 284 is to amplify and shape the output of the photocell 276 which has an essentially sine wave form. The toggle 286 converts this sine wave into a square wave, and the output of the toggle circuit 286 is impressed upon a pulse generator, or multivibrator 288.

The output of this pulse generator 288 is connected to one of two input terminals of a flip flop 290 through a switch 292. The flip flop 290 also has two control input terminals, and a switch 294 selects which of the control terminals is also utilized. The output of the resonator 94 which is connected to the reproducing head 30D, FIGURE 4, is electrically connected through a phase shifter 296 and a toggle circuit 298 to the pole terminal of the switch 294. As stated above, the photocell 276 generates an essentially sinusoidal wave from the movement of the disc 272 affixed at the periphery of the turntable 20, and this sinusoidal wave is impressed upon the toggle circuit 286. Essentially square waves are produced by the toggle circuit, and these trigger the pulse generator 288 to produce positive short pulses of fixed amplitude.

The essentially sinusoidal waves generated by the resonator 94 are also impressed upon the toggle 298 to produce square waves.

Figure 7:
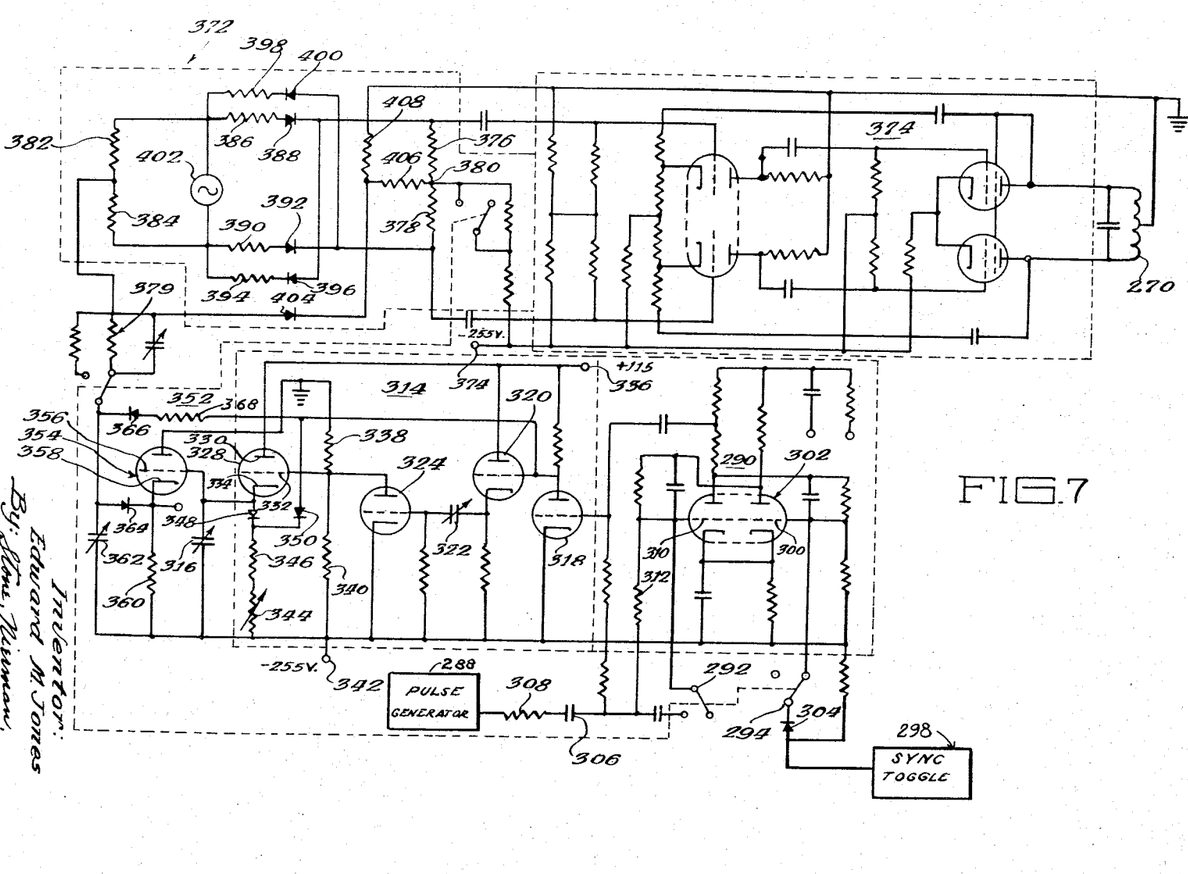
FIGURE 7 is a schematic electrical circuit diagram of a portion of the error signal generator illustrated in block diagram in FIGURE 6.

The electrical circuit diagram of the flip flop 290 is illustrated in FIGURE 7, and the flip flop 290 is of conventional circuit design. It is to be noted that the output of the toggle 298 is connected through the switch 294 to one grid 300 of the vacuum tube 302 which is utilized in the flip flop 290, and that a diode 304 is connected in series with this circuit. Also, the output of the pulse generator 288, or multivibrator, is in the form of positive pulses and these are fed to the grid 310 of a second triode section of the vacuum tube 302. As a result, the flip flop 290 is triggered by the positive going edge of the pulses from the pulse generator 288 in one direction, and the positive going edge of the pulse on the toggle 298 flips the flip flop 290 in the opposite direction.

Figure 8:
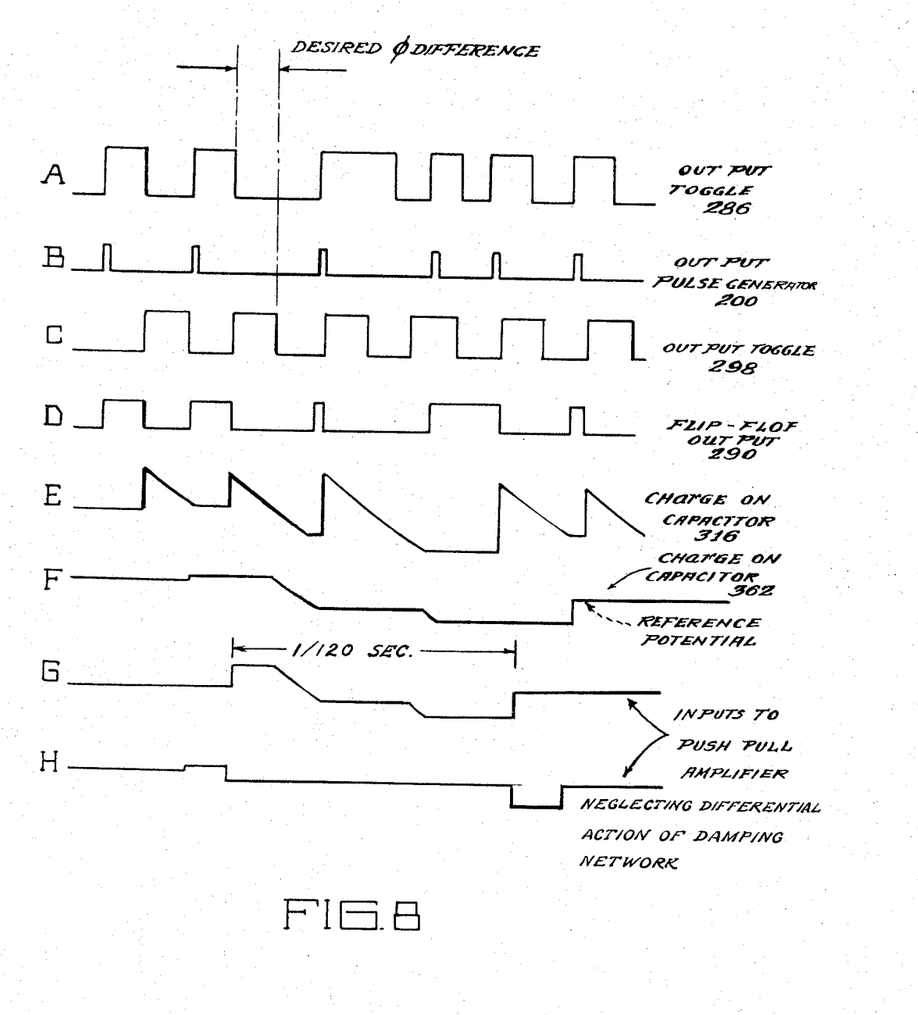
FIGURE 8 contains a plurality of graphs illustrating the shape of electrical waves at various locations in the circuit illustrated in FIGURE 7.

FIGURE 8 shows synchrograms for the voltages at various points in the circuit illustrating operation of the error signal generator. In curve A of FIGURE 8, the rectangular pulses impressed upon the input of the multivibrator or pulse generator 288 are illustrated, and it is to be noted that the differences in the width of these square wave pulses indicate variations in speed of the turntable 20. Curve B of FIGURE 8 illustrates the narrow pulses generated by the multivibrator or pulse generator 288 which are impressed upon the input of the flip flop 290. Curve C illustrates the output from the toggle 298 which represents the clock pulses generated from the tape 26, and it is to be noted that these pulses do not vary in length in the same manner that the pulses showed in curve A. Curve D illustrates the output of the flip flop 290, and it is to be noted that the leading edge of each pulse of curve D corresponds to the positive edge of a pulse of curve A, while the trailing edge of each pulse of curve D corresponds to a positive going edge of a pulse of curve C. Also, it is to be noted that the width of the pulses vary greatly depending upon the phase relation of the pulses indicated in curves A and C.

The output of the flip flop 290, after being amplified by tube 318, is impressed upon the input of a charging circuit 314 which charges a capacitor 316. As indicated in FIGURE 7, the charging circuit 314 has an amplifier employing vacuum tube 320, and is differentiated by a capacitor 322 connected to the input of an amplifier which includes vacuum tube 324. The output of vacuum tube 324 which is taken from a plate 326, is used to trigger a saw-toothed generator which employs vacuum tube 328. Vacuum tube 328 has a plate 330, grid 332, and cathode 334. The plate 330 of vacuum tube 328 is directly connected to the positive terminal 336 of a direction current source, the negative terminal of the source being connected to ground. A grid resistor 338 is connected between the grid 332 and ground. The grid 332 is maintained at a negative potential by a resistor 340 connected to a negative terminal 342 of the direct current power source, and this negative terminal 342 is also connected to the cathode 334 through serially connected resistors 344 and 346 and a diode 348. A second diode 350 is connected between the junction between the diode 348 and the resistor 346 and the plate of vacuum tube 318 of the amplifier.

The charging circuit 314 produces a series of saw-toothed waves as indicated in curve E of FIGURE 8, and these saw-toothed waves are of different lengths. The depth of the saw-toothed waves is determined by the width of the negative going pulse of the curve D of FIGURE 8. The saw-toothed waves appear on the cathode 334 of vacuum tube 328, illustrated in FIGURE 7.

A cathode follower 352 having a vacuum tube 354 is connected to the output of the charging circuit. Vacuum tube 354 has a grid 356 which is connected to the cathode 334 of vacuum tube 328. The cathode 358 of vacuum tube 354 is connected to the negative terminal 342 through a resistor 360, and a capacitor 362 is connected in parallel with the resistor 360 through a diode 364. The capacitor 362 is also connected through a diode 366 and resistor 368 to the flip flop output D.

The saw-toothed generator utilizes the capacitor 316 and the resistors 344 and 346 to produce saw-toothed waves. The saw-tooth waves then pass through the cathode follower 352 and are impressed upon the storage capacitor 362. The storage capacitor 362 is charged through resistor 368 and diode 366 from the plate of vacuum tube 318 as a result of the square wave pulses appearing at this point in the circuit, but only to the voltage at the bottom of the saw-tooth wave. The diode 366 prevents the capacitor 362 from discharging after the charging pulse terminates. The capacitor 362 discharges through the diode 364 and the resistor 360, but only to the value of the voltage at the bottom of the saw-tooth waves. FIGURE 8 indicates the manner in which the charge on the capacitor 362 varies.

The charge on the capacitor 362 is the input to the 60 cycle modulator 372 and passes through a damping circuit 370 to the input of the 60 cycle modulator 372. The 60 cycle modulator produces two outputs indicated in FIGURE 8 by the curves G and H, and these are impressed on the input of the push-pull amplifier 374. The output of the push-pull amplifier 374 is connected to the control winding 270 of the motor 266.

The 60 cycle modulator 372 compares the signals appearing at the output of the damping circuit 370 with a fixed reference potential indicated by the battery 375 in FIGURE 6 but is actually the divider terminal 380 of the same number in FIGURE 7. This fixed reference potential is applied to the junction of two resistors 376 and 378. The resistors 376 and 378 are a part of a bridge circuit, and resistors 382 and 384 are also a part of the bridge and form a junction which is connected to the output of the damping circuit 370. A resistor 386 and a diode 388 connect the resistors 382 and 376, and a resistor 390 and a diode 392 connect the resistors 378 and 384. Also, a resistor 394 and a diode 396 are connected in series between the resistor 384 and the resistor 376, and a resistor 398 and a diode 400 are connected in series between the resistors 382 and the resistor 378. An alternating current potential source 402 is connected in parallel with the resistors 382 and 384. Also, the junction between the resistors 382 and 384 is connected to the junction 380 between the resistors 376 and 378 by a diode 404 and a resistor 406, and the junction between this diode and resistor is connected to ground through a resistor 408.

The modulator 372 is a balance bridge circuit. Only when the voltage at the junction between the resistors 382 and 384 is different than the voltage at the junction 380 is an input potential impressed on the amplifier 374. The resistor 390 and diode 392 are effective to connect positive pulses appearing from the A.C. source 402 between the resistor 390 and the resistor 384 to one of the inputs of the push-pull amplifier 374, and the resistor 394 and diode 396 are effective to conduct negative charges appearing at that point to the other input of the amplifier 374. In like manner, the diode 388 and resistor 386 are effective to conduct positive charges which appear between the resistor 386 and the resistor 382 to the other input of the push-pull amplifier 374, while the resistor 398 and diode 400 conduct negative charges from this point to the first input of the push-pull amplifier 374. In this manner, the unbalanced voltages from the bridge circuit are conducted to the inputs of the push-pull amplifier 374 at the rate of the alternating current source 402, which is 60 cycles in the illustrated construction.

There will be no input to the push-pull amplifier 374 if the output of the damping circuit 370 equals the reference potential of the junction 380. FIGURE 8G and FIGURE 8H illustrate the two inputs to the push-pull amplifier 374. It is to be noted that the 60 cycle modulator impresses on the input of the push-pull amplifier 374 pulses at a rate of 60 cycles per second which have amplitudes corresponding to the phase difference between the turntable 20 and the tape transport mechanism 28, as shown by the curve F of FIGURE 8.

Figure 9A:
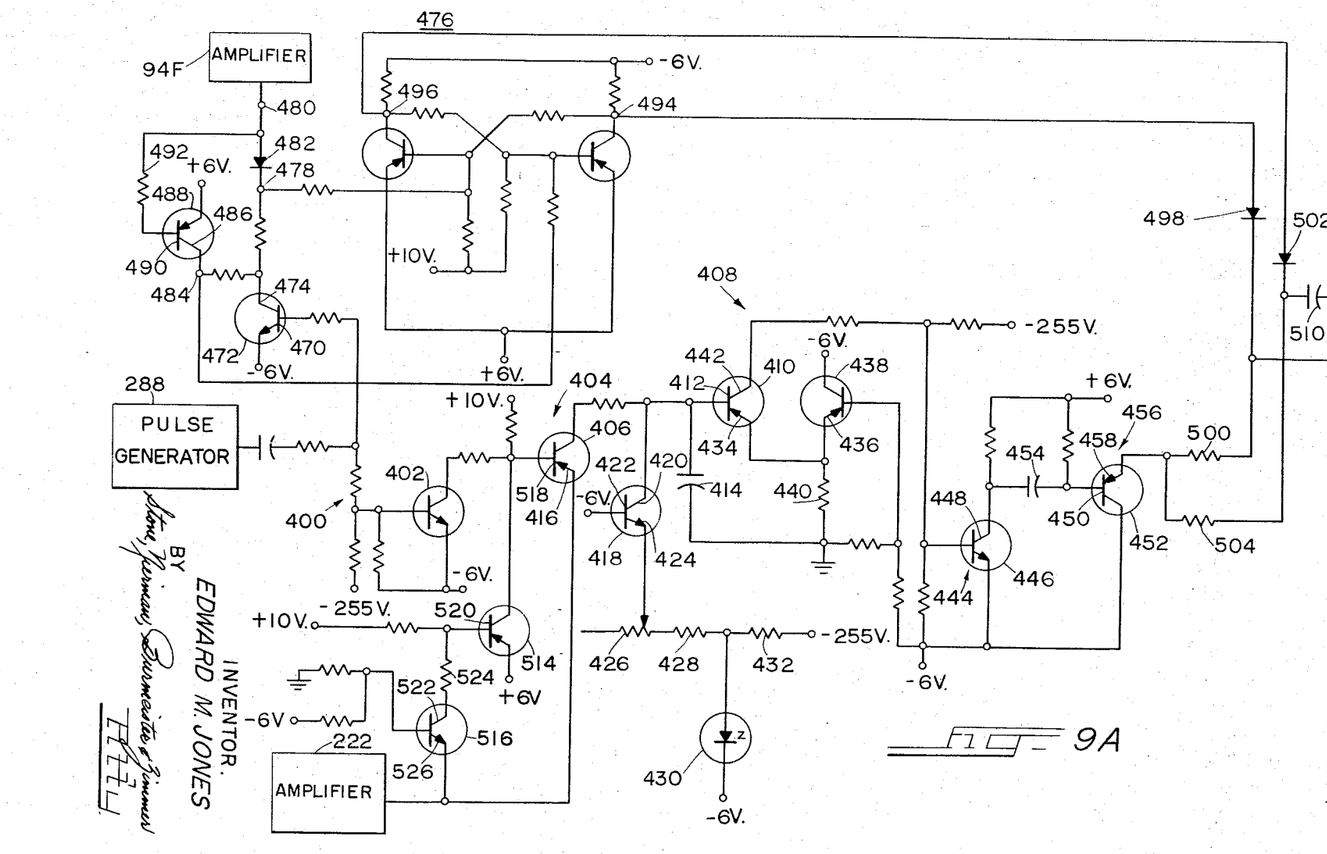
FIGURES 9A and 9B are a schematic electrical circuit diagram of the code generator indicated in FIGURE 1.
Figure 9B:
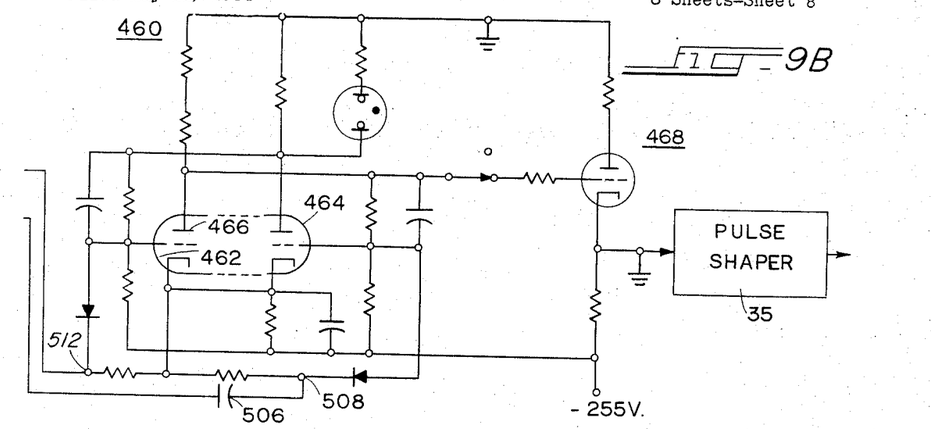

In accordance with the present invention, the magnetic tape 26 has recorded thereon a seven digit number which sets forth the delay required for each transition of the function to be encoded from a pulse of the track 46 of the tape. Normally, a digital computer will be employed to process the tape 26 and to calculate in the form of a binary number the delay following a pulse generated by the track 46 at which each transition occurs for the particular function to be encoded on the code disc 22. A digital computer can be programmed to directly produce the tape 26 in usable form. The analog to digital converter 32 produces on its output terminal 62 an analog signal which is linearly related to the delay from the pulses from the generator 288 for the light pulse from the recorder 24 to produce the desired transition. In other words, the code disc 24 will continue to present an opaque or transparent sector (depending upon the particular part of the disc) until the turntable 20 rotates from the last pulse of the generator 288 a distance determined by the analog output on the terminal 62 of the analog to digital computer 32. FIGURES 9A and 9B illustrate in schematic electrical form the code generator 33 which achieves this delay.

The output of the pulse generator 288 is connected to one of the inputs of the code generator 33, more specifically to the input of an amplifier stage 400 employing a transistor 402. The output of the amplifier stage 400 is connected to the input of a second amplifier stage 404 employing a transistor 406, and the output of the amplifier stage 404 is connected to the input on an amplifier stage 408 employing a transistor 410. The transistor 410 has a base 412, and a capacitor 414 is connected between this base and the ground terminal. The positive going clock pulses from the pulse generator 288 are illustrated in curve A of FIGURE 10, and these pulses are used to charge the capacitor 414. In the particular construction described throughout this specification, the pulses have a height of 50 volts, a width of 45 microseconds, and a period between pulses of 2667 microseconds.

Figure 10:
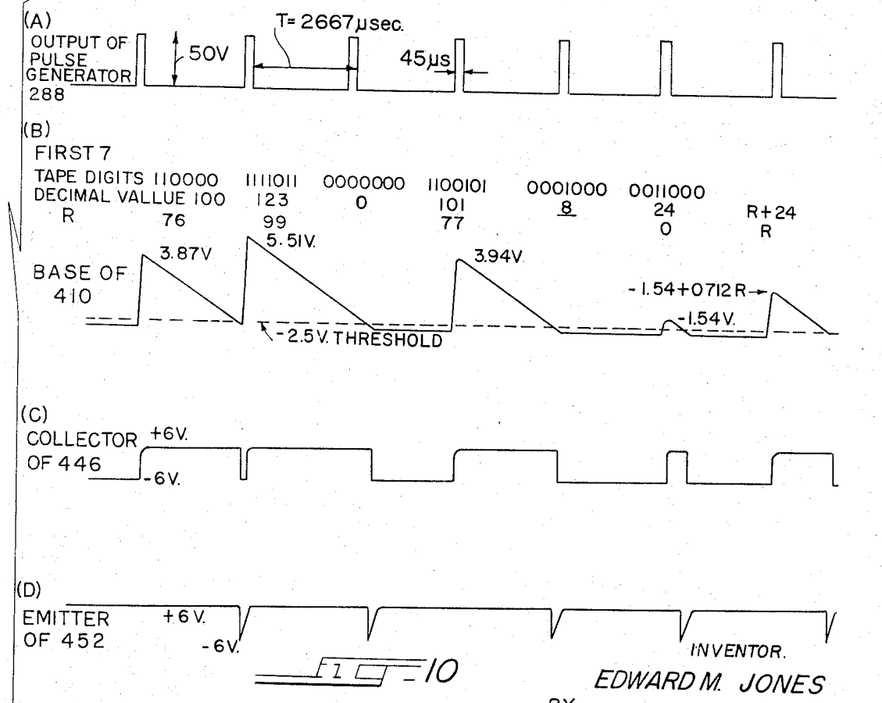
FIGURE 10 contains a plurality of graphs illustrating the shape of electrical waves at various locations in the circuit illustrated in FIGURE 10.

The output of the analog to digital converter 32 determines the magnitude of the charge placed on the capacitor 414 by each clock pulse. This output from the analog to digital converter 32 is amplified by the amplifier 222 and impressed upon the emitter 416 of the transistor 406, so that the height of the pulse appearing on the base 412 of transistor 410 is linearly related to the output of the analog to digital converter 32, and hence the numerical value of the code on the tape 26. Curve B of FIGURE 10 illustrates the charge appearing on the base 412 of transistor 410 for different digital values appearing at the output terminal 62 of the digital to analog converter 32.

The capacitor 414 is shunted by a constant current circuit which employs transistor 418 and a power source. The collector 420 of transistor 418 is connected to the base 412 of transistor 410, and the base 422 of transistor 418 is connected to the negative terminal of a power source, the positive terminal being connected to the circuit ground. Transistor 418 also has an emitter 424 which is connected through a variable resistor 426 and a resistor 428 to a constant potential point provided by a Zener diode 430, a resistor 432, and the indicated potential sources. As a result, the charge generated on capacitor 414 by each clock pulse from the pulse generator 288 decays at a constant rate, as indicated by curve B of FIGURE 10.

The emitter 434 of transistor 410 is connected to the junction between the emitter 436 of transistor 438 and a resistor 440. The transistor 438 maintains the emitter 434 of transistor 410 at a constant potential.

The collector 442 of transistor 410 is connected to the input of a D.C. amplifier 444 employing transistor 446, and the transistor 446 has a collector 448 forming the output of the amplifier stage 444. When the charge on capacitor 414 declines below a threshold value, the potential on the collector 448 of the D.C. amplifier stage 444 shifts abruptly to a negative value, as indicated by curve C of FIGURE 10. The collector 448 of transistor 446 is electrically connected to a base 450 of a transistor 452 by capacitor 454. The transistor 452 is connected in an amplifier stage 456, and the emitter 458 of this stage 456 serves as an output terminal. The sharp transition appearing on the collector 448 of the amplifier stage 444 responsive to a decline in potential of the capacitor 414 appears as a differentiated pulse of the emitter 458 of transistor 452, as indicated by curve D of FIGURE 10. It will be noted that the pulses of curve D of FIGURE 10 are delayed from the clock pulses of curve A of FIGURE 10 by an amount determined by the digital value of the tape 26 which generates that clock pulse.

The differentiated pulses appearing on the emitter of transistor 452 of the amplifier stage 456 are conducted to both inputs of a flip flop stage 460 which employs two triode sections 462 and 464 of a vacuum tube. The flip flop 460 shifts to one of two voltage levels on the plate 466 of vacuum tube section 462 responsive to each delayed pulse from the emitter 458 of transistor 452, and this output is conducted to an amplifier 468, and to the pulse shaper 35 which actuates the ribbons of the ribbon modulator or recorder 24.

The flip flop 460 is required in order to provide a transition from either opaque to transparent or transparent to opaque on the code disc 22. The flip flop 460 is controlled from the output of the pulse generator 288 and output of amplifier 94F of the digital to analog converter 32. The clock pulse from the pulse generator 288 is impressed upon a base 470 of a transistor 472. The collector 474 of transistor 472 is electrically coupled to one of the control inputs of a flip flop 476, this point being designated 478. This point 478 is also connected to the output of amplifier 94F of the digital to analog converter by means of terminal 480 (FIGURE 5) by means of a diode 482 connected to pass positive charges to the point 478. Terminal 480 will have a positive or a negative charge placed thereon responsive to the electrical output of the eighth digit of the tape 26, an example of which is mark 218 on track 42, and if this charge is negative, the pulse on the point 478 from the pulse generator 288 will be effective to set flip flop 476. In this manner, the eight digit of the tape 26 controls the setting of the flip flop 476, and ultimately whether or not a transparent or opaque sector follows a given clock pulse. A second control point of the flip flop 476 is designated 484 and it is connected to a collector 486 of a transistor 488. The base 490 of the transistor 488 is coupled to the output terminal 480 of the analog to digital converter 32 through a resistor 492. If the output of amplifier 94F appearing on terminal 480 is positive, control point 484 controls the setting of the flip flop 476.

The flip flop 476 has two output terminals designated 494 and 496. The one output terminal 494 is connected through a diode 498 and a resistor 500 to the emitter 458 of transistor 452. The other output 496 is connected through a diode 502 and a resistor 504 to the emitter 458 of the transistor 452. The junction of resistor 500 and diode 498 is connected through a capacitor 506 to one control point 508 of the flip flop 460, and the junction between the diode 502 and resistor 504 is connected through a capacitor 510 to the other control point 512 of the flip-flop 460. Since both of the diodes 498 and 502 are connected to pass positive charges to the transistor 452, the negative pulse appearing on the emitter 458 of transistor 452 will be conducted to that control point 512 or 508 of the flip flop 460 which is coupled to the output 494 or 496 of the flip flop 476 which has been set negative as a result of actuation by the eighth digit of the tape 26.

For the particular construction described in this specification, there are 65,536 clock pulses per revolution of the turntable 20, and it is not necessary to have a transition between all adjacent clock pulses. When the output of the analog to digital converter 32 has a voltage less than a certain threshold, an inhibiting circuit prevents premature discharging of the capacitor 414. The inhibiting circuit utilizes transistors 514 and 516. Transistor 514 is connected between the base, designated 518 of transistor 406 and ground through a power source, and controls the potential of the base 518. Transistor 514 has a base 520 which is connected to the collector 522 of transistor 516 through a resistor 524. Transistor 516 has an emitter 526 which is connected to the output of the amplifier 222, and hence the output of the analog to digital converter 32.

It is necessary that transitions occur after some delay, since the code generator 33 requires a minimum delay in all cases, and in the construction described herein, a minimum delay of 400 microseconds is provided following each clock pulse. This means that for a long delay, the transition may occur up to 400 microseconds after the following clock pulse from the pulse generator 288.

The seven digit tape generates numerical values up to 123. The first 24 of these values are not used to avoid threshold errors. Curve B of FIGURE 10 also indicates the numerical value of the tape for digits indicated by ones and zeros. It will be noted that the value "R" ranges from 0 to 99, and is the decimal value of the digital binary output of the tape less 24. The delay in output following a clock pulse is given by 400 microseconds plus $RT/100$, where T is the time between successive clock pulses or 2667 microseconds in this particular construction.

Those skilled in the art will devise many further embodiments of the present invention, and will also devise many modifications of the structure hereinbefore set forth and the methods described. It is, therefore, intended that the scope of the present invention be not limited by the foregoing disclosure, but rather only by the appended claims.

The invention claimed is:

1. A device for transforming a physical characteristic of a member comprising, in combination, means for mounting the member for movement, drive means mechanically coupled to the mounting means for moving the member, an energy source mounted on the mounting means for emitting energy toward the member, the physical characteristic of said member being transformed from one state to another by the presence of energy from said source, and said source including actuating means responsive to an electrical signal for initiating and interrupting the energy directed from the source on the member to produce transitions between adjacent sections of the member of different states, means for generating electrical signals representing digital values of the positions of transitions on the movable member relative to a reference point of a function to be recorded on the member, means for synchronizing the drive means for the member with the means for generating digital values, means electrically connected to the means for generating digital values for converting the digital values into an analog electrical signal, and a code generator electrically connected to the digital to analog converter and the actuating means of the energy source, said code generator producing an actuating electrical signal for the energy source for each transition at a distance from the reference point on the movable member determined by the magnitude of the analog signal.

2. A device for transforming a physical characteristic comprising the elements of claim 1 wherein the member comprises a disc.

3. A device for transforming a physical characteristic of a member comprising the elements of claim 1 wherein the means for converting the digital values into an analog electrical signal comprises a plurality of gate circuits, each gate circuit having an input electrically coupled to the means for generating electrical signals representing digital values of a function, each of said electrical signals being coupled to a different gate circuit, a storage capacitor electrically connected across the output of each gate circuit, each gate circuit passing charges of the electrical signal for charging the capacitor connected thereto and discharging said capacitor in the absence of said charges, a separate means having an input connected across each capacitor for generating an output potential having a first value for charges on said capacitor greater than a threshold value and a second value for charges on said capacitor less than a threshold value, and a plurality of resistors having values in the same ratios as the numerical values of the electrical signals of the generating means, the output of each potential generating means having one terminal of a resistor connected thereto, and the other terminals of said resistors being electrically interconnected.

4. A device for transforming a physical characteristic of a member comprising the elements of claim 3 wherein each gate circuit includes a control input, said gate circuit conducting in either direction during periods in which a potential is impressed on said control input, in combination with a pulse generator having an output terminal electrically connected to the control input of the gate circuits.

5. A device for transforming a physical characteristic of a member comprising the elements of claim 3 wherein the means for generating an output potential having a first and a second value comprise direct current amplifiers, each amplifier having a first pnp transistor and a first npn transistor with the emitters of these transistors interconnected, a first potential source having a positive and a negative terminal and a central tap electrically connected to the emitters, a first and a second resistor electrically connected in series between the positive terminals of the power source and the collector of the npn transistor, a third and a fourth resistor connected in series between the negative terminal of the power source and the collector of the pnp transistor, a second pnp transistor and a second npn transistor, the base of the second pnp transistor being connected to the junction of the first and second transistor and the base of the npn transistor being connected to the junction between the third and fourth resistors, the collectors of said third and fourth transistors being interconnected and forming an output terminal, and a second direct current power source having a positive terminal connected to the emitter of the second pnp transistor and a negative terminal electrically connected to the emitter of the npn transistor, said second power source having a center tap electrically connected to the emitters of the first pnp and npn transistors.

6. A device for transforming a physical characteristic of a member comprising the elements of claim 1 wherein the means for generating electrical signals representing digital values of the position of transitions on the movable member relative to a reference point of a function to be recorded on the member comprises a tape transport mechanism, an elongated tape mounted on the tape transport mechanism, said tape having a plurality of paths parallel to the longitudinal axis of the tape containing a first segment and a second segment of different physical characteristics, the first segments being disposed between second segments, and a transducing means confronting each of said paths for generating an electrical signal responsive to the presence of first segments in said path.

7. A device for transforming a physical characteristic of a member comprising the elements of claim 6 wherein the tape has a layer of magnetically polarizable material and only the first sectors in each of said paths have polarization axes oriented in a given direction relative to the direction of motion of the tape, and each transducer comprises an electromagnetic reproducing head.

8. The method of encoding a member with a predetermined plurality of values of a mathematical function comprising the steps of computing in digital form the values of the independent variable of said function for each of the predetermined values of the dependent variable of said function and computing in digital form the distance of each of said independent variable values from a reference point on the movable member, encoding an elongated tape with the calculated values of the distance each of said independent variable value is from the reference point, said tape having a plurality of segments disposed in an uninterrupted row along the longitudinal axis thereof, each of said segments having the same width measured along the axis of the tape, each calculated value of the independent variable being disposed in the segment of the tape following the segment thereof containing the value of the independent variable from the next preceding value of the dependent variable, and each bit of each value of the dependent variable being disposed in a track on the tape parallel to the longitudinal axis of the tape containing bits of other values of the independent variable of equal significance, translating the tape along its longitudinal axis, generating an electrical signal for each track of the tape, converting the electrical signals into a single electrical signal representing the analog value of the digital values on said tape passing a fixed point, moving the member in synchronism with the translation rate of the tape, and controlling a recording means mounted in a fixed position confronting a portion of the member to actuate and deactuate the recording means responsive to the single analog electrical signal to provide transitions in physical characteristics of the member at the distance from the reference point for each of the values of the independent variable.

9. The method of encoding a photosensitive disc with a plurality of values of a mathematical function comprising the steps of computing in binary digital form the values of the independent variable of said function for each of the values of the dependent variable of said function, computing in binary digital form a value for each value of the independent variable for the proportion of the distance between adjacent points of a plurality of equally spaced reference points on the disc, encoding an elongated tape with the calculated values of the proportion of the distance between reference points for each independent variable, each bit of each of said values being disposed in a track on the tape parallel to the longitudinal axis of the tape containing bits of other of said values of equal significance, translating the tape along its longitudinal axis, generating an electrical signal for each track of the tape, converting the electrical signals into a single analog electrical signal, rotating the photosensitive disc in synchronism with the translation rate of the tape, generating an electrical pulse each time a reference point of the disc passes a fixed point, and controlling a light source mounted in a fixed position confronting and focused on a spot on the photosensitive disc responsive to the value of the analog signal, said light source having a light transition only at times delayed from the time of the preceding reference pulse linearly related to the magnitude of the analog electrical signal.

10. A device for encoding a disc with the binary digital values of a non-linear code comprising a turntable adapted to carry the disc on its surface, said disc having a photosensitive film thereon, a tape transport mechanism, a magnetic tape carried by the tape transport mechanism, means for translating the tape on the tape transport mechanism and means for rotating the turntable, means for synchronizing the rotation rate of the turntable and the translation rate of the tape, means operatively associated with the turntable for generating a pulse responsive to rotation of each of a plurality of equally spaced reference points on the turntable past a fixed position, said plurality of pulses being equal to the total number of radial sectors of equal arc of the disc to be encoded with a dependent value of said function, said tape having a plurality of tracks of magnetic indicia disposed along the longitudinal axis thereof, said indicia being disposed in a plurality of equally spaced rows transverse of the tape forming a plurality of digital binary numbers, each of said numbers having bits of the same significance disposed in the same track of the tape, each digital number on said tape having a value relative to the total value of the tape equal to the fraction of the distance between a reference point on the disc and the location of the independent variable at which the dependent variable changes by one unit to the total distance between reference points on the disc, a pickup head positioned adjacent to each track of the tape to produce an electrical signal responsive to each change in indicia of the tape, said pickup heads being disposed in a row normal to the longitudinal axis of the tape, a digital to analog converter having inputs electrically connected to each of the pickup heads and an output, a code generator electrically connected to the output of the converter, said code generator producing a pulse delayed from each reference pulse by a time interval which is linearly related to the value of the analog signal, a light source directed on the photosensitive surface on the turntable, said light source having a shutter means electrically connected to the code generator, said shutter means being actuated responsive to each pulse of the code generator.

11. A device for encoding a disc comprising the combination of claim 10 wherein the code generator comprises means for generating a delay pulse having a height above a threshold value, the magnitude of said pulse being linearly related to the magnitude of the electrical analog signal of the analog to digital converter, a constant current device electrically connected to the pulse generating means for decaying said pulse at a constant rate, and means electrically connected to the pulse generating means for generating an actuation pulse for the light source responsive to the amplitude of the delay pulse falling below said threshold value.

12. A device for encoding a disc comprising the combination of claim 11 in combination with means electrically connected to the delay pulse generating means of the code generator for inhibiting generation of a pulse for value of the analog signal less than a second threshold value lower than the first threshold value, thereby preventing actuation pulses for the light source for analog signals having values lower than the second threshold values.

13. The method of encoding a member with a predetermined plurality of values of a mathematical function comprising the steps of computing in digital form the values of the independent variable of said function for each of the predetermined values of the dependent variable of said function and computing in digital form the distance of each of said independent variable values from one of a set of reference points on the movable member, encoding an elongated tape with the calculated values of the distance each of said independent variable value is from the reference point, each calculated value of the independent variable being spaced along the longitudinal axis of the tape by a number of equal increments from the value of the independent variable from the next preceding value of the dependent variable, the number of equal increments being dependent on the number of reference points skipped, and each bit of each value of the dependent variable being disposed in a track on the tape parallel to the longitudinal axis of the tape, translating the tape along its longitudinal axis, generating an electrical signal for each track of the tape, converting the electrical signals into a single electrical signal representing the analog of the digital values on said tape, moving the member in synchronism with the translation rate of the tape, and controlling a recording means mounted in a fixed position confronting a portion of the member to actuate and deactuate the recording means responsive to the single analog electrical signal to provide transitions in physical characteristics of the member at the distance from a reference point for each of the values of the independent variable.

14. A device for transforming a physical characteristic of a member comprising the combination of claim 6 in combination with electronic computing means for calculating the dependent values for a predetermined plurality of independent values of a mathematical function in digital form and the digital form values of the distance of each of said independent variable values from a reference point on a movable member, a magnetic tape recorder electrically connected to the output of the computer for recording said independent variable values on the elongated tape.

References Cited

UNITED STATES PATENTS

| | | | |
|---|---|---|---|
| 2,924,138 | 2/1960 | Jones | 84—1.28 |
| 3,008,372 | 11/1961 | Willey et al. | 346—107 |
| 3,040,322 | 6/1962 | Malianey et al. | 346—107 |

MAYNARD R. WILBUR, *Primary Examiner.*

D. W. COOK, W. J. KOPACZ, *Assistant Examiners.*

UNITED STATES PATENT OFFICE
CERTIFICATE OF CORRECTION

Patent No. 3,344,418                                          September 26, 1967

Edward M. Jones

It is hereby certified that error appears in the above numbered patent requiring correction and that the said Letters Patent should read as corrected below.

Column 2, line 2, for "cold" read -- code --; column 7, line 3, for "to" read -- and --; line 28, for "87F" read -- 78F --; column 18, line 39, for "value" read -- values --.

Signed and sealed this 15th day of October 1968.

(SEAL)
Attest:

Edward M. Fletcher, Jr.                                  EDWARD J. BRENNER
Attesting Officer                                                  Commissioner of Patents